United States Patent [19]

Tsuruta et al.

[11] 4,336,361
[45] Jun. 22, 1982

[54] PROCESS OF PREPARING LINEAR POLYDIVINYLBENZENE

[75] Inventors: Teiji Tsuruta, Yokohama; Yoshiaki Nitadori, Nobeoka, both of Japan

[73] Assignee: Asahi Kasei Kogyo Kabushiki Kaisha, Osaka, Japan

[21] Appl. No.: 207,529

[22] Filed: Nov. 17, 1980

Related U.S. Application Data

[62] Division of Ser. No. 58,595, Jul. 18, 1979, abandoned.

[30] Foreign Application Priority Data

Apr. 23, 1979 [JP] Japan .................................. 54/48965
Apr. 23, 1979 [JP] Japan .................................. 54/48966

[51] Int. Cl.³ ............................................. C08F 4/46
[52] U.S. Cl. ................................ 526/180; 526/179; 526/336
[58] Field of Search .............................. 526/180, 179

[56] References Cited

U.S. PATENT DOCUMENTS

| | | | |
|---|---|---|---|
| 2,363,836 | 11/1944 | D'Alelio | 526/336 |
| 2,378,195 | 6/1945 | D'Alelio | 526/336 |
| 2,901,470 | 8/1959 | Gresham | 526/336 |
| 2,989,515 | 6/1961 | Buton et al. | 526/336 |
| 3,049,525 | 8/1962 | Benning | 526/336 |
| 3,751,403 | 8/1973 | Hara et al. | 526/336 |
| 3,935,177 | 1/1976 | Muller et al. | 526/180 |
| 4,230,841 | 10/1980 | Prudence | 526/180 |
| 4,254,247 | 3/1981 | Boileau et al. | 526/180 |

*Primary Examiner*—William F. Hamrock
*Attorney, Agent, or Firm*—Sprung, Horn, Kramer & Woods

[57] ABSTRACT

A linear polydivinylbenzene having recurring units of Formula (A),

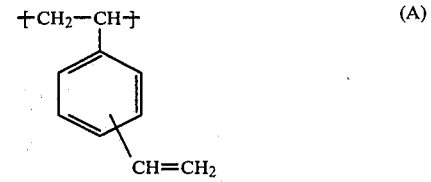

and a number average molecular weight of about 500 to about 1,000,000; a linear copolymer having at least about 1% by weight of recurring units of Formula (A) as described above and at most about 99% by weight of recurring units of at least one of Formulae (B) and (C),

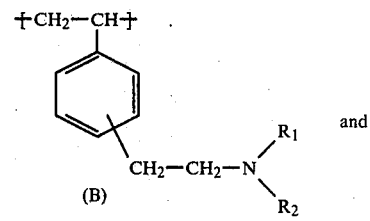

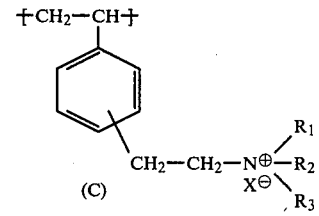

wherein $R_1$ and $R_2$ may be the same or different and each represents a hydrogen atom, a $C_{1-20}$ alkyl group, a $C_{3-10}$ cycloalkyl group, a $C_{7-12}$ arylalkyl group, a $C_{3-8}$ alkenyl group, a $C_{6-15}$ aryl group, a $H_2N-(CH_2)_n$ group wherein n is an integer of 1 to 15 or a $H-(NH-CH_2-CH_2)_m$ group wherein m is an integer of 2 to 8; and $R_3$ represents a hydrogen atom, a $C_{1-12}$ alkyl group, a $C_{3-10}$ cycloalkyl group, a $C_{7-12}$ arylalkyl group or a $C_{3-8}$ alkenyl group; and X is an acid radical, based on the total weight of the recurring units of Formulae (A) and (B) and/or (C), and a number average molecular weight of about 500 to about 1,000,000; and a process of preparing the linear polydivinylbenzene or the linear copolymer as described above.

12 Claims, No Drawings

PROCESS OF PREPARING LINEAR POLYDIVINYLBENZENE

This is a division of Application Ser. No. 58,595, filed July 18, 1979 now abandoned.

BACKGROUND OF THE INVENTION

1. Field of the Invention

This invention relates to a novel linear polydivinylbenzene, a novel derivative thereof containing nitrogen atoms and a process for the production thereof.

2. Description of the Prior Art

Divinylbenzene is capable of radical polymerization and ion polymerization, and when divinylbenzene is polymerized or copolymerized with a monoethylenical unsaturated monomer to give a polymer or a copolymer whose main chain is cross-linked since the two double bonds in the divinylbenzene participates in the polymerization. The cross-linked polymer or copolymer which does not dissolve in any solvent nor melts has been widely used as an ion exchanger, chelate resin, a variety of adsorbents or the precursor thereof. However, it has not been known that one of the two double bonds in divinylbenzene may be polymerized to give a unique linear polymer having a number of pendent active double bonds.

SUMMARY OF THE INVENTION

According to the present invention in one embodiment there is provided a linear polydivinylbenzene having recurring units of Formula (A),

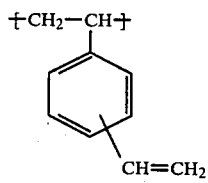

(A)

and a number average molecular weight of about 500 to about 1,000,000.

The present invention in another embodiment provides a linear copolymer having at least about 1% by weight of recurring units of Formula (A),

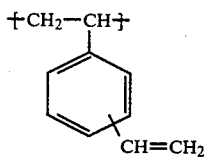

and at most about 99% by weight of recurring units of at least one of Formulae (B) and (C),

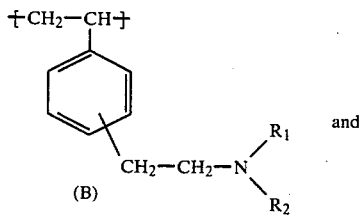

and

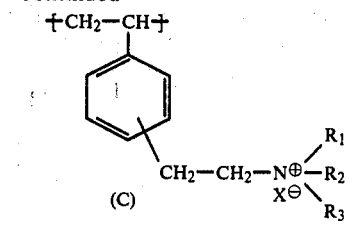

wherein $R_1$ and $R_2$ may be the same or different and each represents a hydrogen atom, a $C_{1-20}$ alkyl group, a $C_{3-10}$ cycloalkyl group, a $C_{7-12}$ arylalkyl group, a $C_{3-8}$ alkenyl group, a $C_{6-15}$ aryl group, $H_2N\text{-}(CH_2)_{\overline{n}}$ wherein n is an integer of 1 to 15 or $H\text{-}(NH\text{-}CH_2\text{-}CH_2)_{\overline{m}}$ wherein m is an integer of 2 to 8; $R_3$ represents a hydrogen atom, a $C_{1-12}$ alkyl group, a $C_{3-10}$ cycloalkyl group, a $C_{7-12}$ arylalkyl group or a $C_{3-8}$ alkenyl group; and X is an acid radical, based on the total weight of the recurring units of Formulae (A) and (B) and/or (C) and a number average molecular weight of about 500 to about 1,000,000.

In still another embodiment, the present invention provides a process of preparing the linear polydivinylbenzene as described above.

In a further embodiment, the present invention provides the linear copolymer as described above.

DETAILED DESCRIPTION OF THE INVENTION

Specific examples of suitable $R_1$, $R_2$ and $R_3$ groups in Formulae (A) and (B) as described above include hydrogen atom; $C_{1-20}$ alkyl groups such as methyl, ethyl, n-propyl, isopropyl, n-butyl, isobutyl, sec-butyl, tert-butyl, n-pentyl, isopentyl, n-hexyl, n-heptyl, n-octyl, 2-ethylhexyl, n-nonyl, n-decyl, n-dodecyl, n-tetradecyl, h-hexadecyl and n-octadecyl; $C_{3-10}$ cycloalkyl groups such as cyclopropyl, cyclobutyl, cyclopentyl, cyclohexyl, cycloheptyl, and cyclooctyl; $C_{3-8}$ alkenyl groups such as allyl, crotyl and hexenyl; $C_{6-15}$ aryl groups such as phenyl, toluyl, trimethylphenyl, diethylphenyl, naphthyl and biphenyl; $C_{7-12}$ arylalkyl groups such as benzyl, α-phenethyl, β-phenethyl, γ-phenethyl and phenyl-tert-butyl; and $H_2N\text{-}(CH_2)_{1-15}$ groups such as aminoethyl, aminopropyl, aminohexyl and aminododecyl. Of these groups, the $C_{1-20}$ alkyl groups and the combinations of $R_1$ and $R_2$ being a hydrogen atom and a $C_{1-20}$ alkyl group are preferred from their ease in preparation. Of the $C_{1-20}$ alkyl groups, $C_{1-8}$ alkyl groups are more preferred. When the $C_{1-20}$ alkyl groups are employed, the nitrogen content per unit weight of the linear copolymer is reduced with increased numbers of carbon atoms and accordingly, the function of the nitrogen atom tends to be reduced. When at least one of $R_1$ and $R_2$ is an aminoalkyl group, the nitrogen content per unit weight of the linear copolymer is increased. Preferred combinations of $R_1$ and $R_2$ groups in Formulae (B) and (C) include ($CH_3$, $CH_3$), ($C_2H_5$, $C_2H_5$), (H, $C_2H_5$), (H, n-$C_3H_7$), (H, iso-$C_3H_7$), (H, sec-$C_4H_9$), (H, cyclo$C_6H_{11}$),

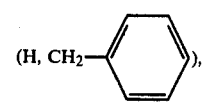
(H, $CH_2$-⟨⟩), ($CH_3$, $CH_2CH_2NH_2$), ($CH_2CH_2NH_2$, $CH_2CH_2NH_2$), (H, $CH_2CH=CH_2$), ($CH_2CH=CH_2$, $CH_2CH=CH_3$) and ($CH_2CH_2NH_2$, $CH_2CH_2NHCH_2CH_2NH_2$).

The X group in Formula (C) represents a so-called acid radical. Specific examples of suitable X groups include halogen atoms such as F, Cl, Br and I; inorganic anions such as $\frac{1}{2}SO_4$, $\frac{1}{2}SO_3$, $HSO_4$, $NO_3$, $NO_2$, $\frac{1}{2}CrO_4$, SCN, $ClO_4$, OH, $H_2PO_4$, $\frac{1}{2}HPO_4$, $\frac{1}{3}PO_3$, $HCO_3$, $\frac{1}{2}CO_3$, CN and $MnO_4$; carboxylate anions of $R_4COO$ wherein $R_4$ is a $C_{1-20}$ alkyl group, a $C_{6-15}$ aryl group, a $C_{1-10}$ haloalkyl group or a $C_{1-10}$ hydroxyalkyl group, such as HCOO, $CH_3COO$, $C_2H_5COO$, $CH_3(CH_2)_8COO$, $CH_3(CH_2)_{16}COO$, $C_6H_5COO$, $CH_3C_6H_5COO$, $CH_2ClCOO$, $CH_2FCOO$ and $CH_3CH(OH)COO$; sulfonate anions of $R_5SO_3$ wherein $R_5$ is a $C_{1-8}$ alkyl group, a $C_{6-20}$ aryl group or a $C_{7-20}$ alkylaryl group, such as $CH_3SO_3$, $C_2H_5SO_3$, $C_6H_5SO_3$, $CH_3C_6H_4SO_3$ and $C_{12}H_{25}C_6H_4SO_3$; and sulfuric ester anions such as $CH_3OSO_3$ and $C_2H_5OSO_3$.

When the number average molecular weight of the four types of the linear polydivinylbenzenes having the recurring units of (I) formula (A); (II) Formulae (A) and (B); (III) Formulae (A) and (C); and (IV) Formulae (A), (B) and (C) is about 500, the terminal groups of the linear polydivinylbenzenes are found to be a hydrogen atom and a diisopropylamino group. When the molecular weight of the linear polydivinylbenzenes increases the analysis of the terminal groups becomes difficult but it is assumed that the terminal groups are also a diisopropylamino group and a hydrogen atom.

The linear polydivinylbenzene having recurring units of Formula (A) can be produced by adding lithium diisopropylamide and divinylbenzene to an inert polar solvent in the presence of diisopropylamine.

The divinylbenzene employed may be the para-, meta- or orthoisomer of divinylbenzene and of these isomers, p-divinylbenzene is preferred since the polymerizability is higher and a linear polydivinylbenzene having a high degree of polymerization can be produced. The linear polydivinylbenzene obtained from p-divinylbenzene has a high reactivity due to the pendent double bonds in the remotest position to the main chain and are useful for preparing the derivatives thereof.

The amount of the diisopropylamine employed is not particularly limited and typically ranges from about 0.5 to about 50 moles per mole of the lithium diisopropylamide. A preferred amount ranges from about 1.5 to about 20 moles per mole of the lithium diisopropylamide. The amount of the diisopropylamine is too small, the activity of the lithium diisopropylamide decreases.

The lithium diisopropylamide can be prepared by reacting diisopropylamine with a $C_{1-20}$ alkyllithium, a $C_{6-15}$ aryllithium, lithium hydride or lithium aluminum hydride. Of these lithium compounds, the $C_{1-20}$ alkyllithium is preferred due to the ease of reaction, and n-butyllithium is especially preferred from the standpoint of its easy availability.

The lithium diisopropylamide acts as a polymerization catalyst. The amount of lithium diisopropylamide which can be employed is about 0.001 to about 1.0 mole per mole of the divinylbenzene employed. A preferred amount is about 0.01 to about 0.5 mole per mole of the divinylbenzene. When the amount of the lithium diisopropylamide is too small, all the lithium diisopropylamide may be deactivated by impurities having an active hydrogen which are present in the inert polar solvent and accordingly, it is necessary to highly purify the inert polar solvent before use.

The inert polar solvents which can be employed may be any organic liquids having a dielectric constant of at least 6 and not having any active hydrogen nor any carbonyl groups other than an amido group which react with the lithium compounds and include tetrahydrofuran, dimethyl sulfoxide, N,N-dimethylformamide, hexamethylphosphoric triamide, N-methyl-2-pyrrolidone and N,N-dimethylacetamide. Of these inert polar organic solvents, tetrahydrofuran is especially preferred due to the increased rate of reaction and the easy treatment after the reaction.

It is preferred that the inert polar solvents are sufficiently purified before use.

The amount of the inert polar solvent used is not particularly limited and the amount typically ranges from about 1 to about 50 times and preferably about 5 to about 30 times the volume of the divinylbenzene. When the amount of the inert polar solvent is too small, the viscosity of the reaction mixture becomes high and the polymerizability of the divinylbenzene disadvantageously decreases.

The reaction temperature employed typically ranges from about 31 70° C. to about 100° C. and preferably from about −20° C. to about 50° C.

The reaction time may vary depending upon the factors which govern the rate of reaction such as the isomer of divinylbenzene chosen, the concentration of the divinylbenzene employed, the inert polar organic solvent selected and the reaction temperature employed. The reaction time typically ranges from about 30 seconds to about 20 hours, preferably from about 1 minute to about 8 hours and more preferably from 3 minutes to about 5 hours. It is preferred that the reaction time should be determined, for example, by detecting the decreasing amount of unreacted divinylbenzene in the reaction system by gas chromatography. When the reaction is continued for a long period of time after the consumption of the divinylbenzene, the gellation may occur disadvantageously.

The reaction pressure may be either atmospheric or a pressure above atmospheric, but atmospheric pressure is preferred for practical purposes.

A preferred reaction operation for producing a linear polydivinylbenzene having recurring units of Formula (A) comprises charging an inert polar solvent and diisopropylamide in an amount at least equimolar to a lithium compound such as a $C_{1-20}$ alkyllithium to be added next in reactor, adding, firstly, a $C_{1-20}$ alkyllithium such as n-butyllithium and secondly, divinylbenzene to the mixture with sufficient stirring and continuing stirring or shaking the resulting mixture. The reaction can be terminated by addition of water or an alcohol such as methanol and ethanol to the reaction mixture. The linear polydivinylbenzene thus obtained can be purified by pouring the reaction mixture to methanol or hexane to precipitate the polymer again, washing the polymer precipitated with the same liquid medium and then drying the polymer.

The characteristic features of the linear polydivinylbenzene will now be explained.

Molecular Weight:

The molecular weight can be determined by gel permeation chromatography in which the reaction mixture as such can be employed as a sample for measurement and which is a very useful means for measuring the progress of the reaction.

The molecular weight of the linear polydivinylbenzene according to this reaction tends to increase with decreased amounts of the diisopropylamine and the lithium diisopropylamide based on the amount of the divinylbenzene but the molecular weight is not much influenced by the reaction time.

The number average molecular weight of the linear polydivinylbenzene obtained by the reaction of this invention typically ranges from about 500 to about 1,000,000, preferably from about 2,000 to about 200,000 and more preferably from about 4,000 to about 100,000.

The coagulant and the ion exchanger prepared from the linear polydivinylbenzene having a high number average molecular weight has a high coagulative effect and a high mechanical strength, respectively. The coagulant prepared from the linear polydivinylbenzene having a low number average molecular weight has an improved solubility in a solvent and the types of the solvents which can be employed are increased.

Pendent Double Bond:

The existence of the pendent double bond groups can be qualitatively and quantitatively confirmed by infrared spectroscopy, nulcear magnetic resonance spectroscopy and the reaction with mercuric acetate. According to these means it has been confirmed that one —CH=CH$_2$ group is bonded to one benzene nucleus.

Solubility:

The polydivinylbenzene of this invention is completely soluble in tetrahydrofuran, benzene, chloroform and acetone and this fact suggests that the linear polydivinylbenzene is not a cross-linked polymer, but a linear polymer.

Use:

The structure of the polydivinylbenzene having a number of pendent double bonds is unique and a variety of the derivatives can be produced by using the reactivity of the pendent double bonds.

The linear copolymer having recurring units of Formulae (A) and (B) of this invention can be produced by reacting an amine of Formula (D),

(D)

wherein $R_1$ and $R_2$ may be the same or different and each represents a hydrogen atom, a $C_{1-20}$ alkyl group, a $C_{3-10}$ cycloalkyl group, a $C_{7-12}$ arylalkyl group, a $C_{3-8}$ alkenyl group, a $C_{6-15}$ aryl group, a $H_2N\text{-}(CH_2)_{\overline{n}}$ group wherein n is an integer of 1 to 15 or a $H\text{-}(NH\text{-}CH_2\text{-}CH_2)_{\overline{m}}$ group wherein m is an integer of 2 to 8, with a linear polydivinylbenzene having recurring units of Formula (A) in the presence of an alkali metal amide of Formula (E),

(E)

wherein $R_1$ and $R_2$ are the same as defined above and M is an alkali metal.

As the amines of Formula (D), either primary amines or secondary amines can be employed but methylamine (one of $R_1$ and $R_2$=H, the other=CH$_3$) and ammonia ($R_1$ and $R_2$=H) are disadvantageous due to their low reactivity.

Examples of suitable amines include alkylamines such as ethylamine, n-propylamine, isopropylamine, n-butylamine, sec-butylamine, tert-butylamine, n-pentylamine, isopentylamine, n-hexylamine, n-heptylamine, 2-ethylhexylamine, n-nonylamine, n-decylamine, n-dodecylamine, n-tetradecylamine, n-hexadecylamine and n-octadecylamine, dimethylamine, diethylamine, di-n-propylamine, diisopropylamine, di-n-butylamine, di-n-octylamine, cyclohexylamine, cyclopentylamine, dicyclopropylamine, dicyclohexylamine, allylamine, diallylamine, crotylamine, benzylamine, phenethylamine, aniline, N-methylaniline, ethyleneimine, ethylenediamine, trimethylenediamine, hexamethylenediamine, octamethylenediamine, dodecamethylenediamine, diethylenetriamine, dipropylenetriamine, N-methylethylenediamine, N-ethylethylenediamine and N,N'-diethylethylenediamine.

General the reactivity of the secondary amines is greater than that of the primary amines. When a primary amino group is present with a secondary amino group in the molecule of an amine, generally the secondary amino group having higher reactivity selectively adds to the pendent double bond of divinylbenzene.

In order to conduct the reaction in a homogeneous system and to control the rate of reaction it is preferred to conduct the reaction in an inert organic solvent. It is required that firstly, the inert organic solvent employed does not react with the alkali metal amide of Formula (E) and secondly the solvent dissolves the linear polydivinylbenzene having recurring units of Formula (A) therein. Thus, alcohols and carboxylic acids which has an active hydrogen atom or other compounds having a carbonyl group other than an amide group cannot be employed.

Examples of suitable inert organic solvents which can be employed include hydrocarbons such as benzene and toluene; ethers such as dioxane and tetrahydrofuran; and aprotic polar solvents such as dimethyl sulfoxide, N,N-dimethylformamide and hexamethylphosphoric triamide. Of these solvents, tetrahydrofuran is especially preferred since the rate of reaction is high and as a result, the reaction time can be shortened, and the solubility of the linear polydivinylbenzene having recurring units of Formula (A) in tetrahydrofuran is good.

The amount of the inert organic solvent used is not particularly limited and typically ranges from about 5 to about 200 times and preferably from about 10 to about 50 times the weight of the linear polydivinylbenzene having recurring units of Formula (A). When the amount is too small, the viscosity of the reaction mixture becomes too high. Also, when the amount is too large, the rate of reaction becomes low.

The reaction temperature is not particularly limited but depends upon the amine of Formula (D) employed and the solvent selected. The reaction temperature typically ranges from about −80° C. to about 100° C. and preferably ranges from about −20° C. to about 70° C. The reactivity increases with higher polarities of the inert organic solvent and accordingly, when the reactivity is high, the reaction sufficiently proceeds at low temperatures.

The reaction time required depends upon the reactivity and typically ranges from 5 minutes to about 50 hours and preferably from 30 minutes to about 30 minutes.

The alkali metals represented by M in the alkali metal amide of Formula (E) employed include lithium, sodium and potassium. Of these alkali metals, lithium is preferred due to its high reactivity and easy reaction operation.

One preferred method of preparing the lithium amide comprises reacting an amine of the formula (D) with a $C_{1-20}$ alkyllithium, phenyllithium, lithium hydride or lithium aluminum hydride. Of these lithium compounds, the $C_{1-20}$ alkyllithium is especially preferred due to its high solubility in a solvent and ease in handling.

Examples of suitable alkyllithiums which may be employed include methyllithium, ethyllithium, b-butyllithium, n-octyllithium and the like. Of these alkyllithiums, commercially produced n-butyllithium is especially preferred from the standpoint of availability.

The alkali metal amide of Formula (E) has catalytic activity, and it is sufficient to use the alkali metal amide of Formula (E) in an amount of less than an equimolar amount of the pendent double bond of the linear polydivinylbenzene having recurring units of Formula (A). A preferred amount is from about 0.001 to about 0.5 mole per mole of the pendent double bond of the linear polydivinylbenzene having recurring units of Formula (A), and a more preferred amount is from about 0.01 to about 0.2 mole per mole of the pendent double bond of the linear polydivinylbenzene having recurring units of Formula (A). With increased amounts of the alkali metal amide of Formula (E) the reactivity increases.

Since the alkali metal amide of Formula (E) is deactivated by the reaction with a compound having an active hydrogen such as water, an alcohol or an acid present in the reaction system, it is preferred that the starting material and the solvent used are previously purified. But when such compounds having an active hydrogen cannot be removed but remain in the reaction mixture, it is preferred to use the alkali metal amide of Formula (E) in an amount greater than that to be deactivated.

The chemical structure of the linear polydivinylbenzene obtained can be designed by varying the amount of the amine of Formula (D) used. The amine of Formula (D) is typically used in an amount of about 0.2 to about 40 moles per mole of the pendent double bond of the linear polydivinylbenzene having recurring units of Formula (A). When the amount of Formula (D) is used in an amount of less than an equimolar amount of the pendent double bond of the linear polydivinylbenzene having recurring units of Formula (A), part of the pendent double bonds remains as such to give a copolymer having recurring units of Formulae (A) and (B). Since this reaction is a so-called "polymer reaction", the rate of reaction is relatively low and is reduced as the reaction proceeds. In order to maximize the content of the recurring units of Formula (B), it is necessary to employ an excess amount of the amine of Formula (D) and preferably about 1.5 to about 40 moles and more preferably about 2 to about 10 moles per mole of the pendent double bond of the linear polydivinylbenzene having recurring units of Formula (A).

A preferred reaction operation for producing a linear copolymer having recurring units of Formula (A) and (B) comprises mixing an amine of Formula (D) with part of the inert solvent, adding an alkyllithium such as n-butyllithium to the mixture to form a lithium amide of Formula (E), adding a mixture of the remaining inert solvent with a linear polydivinylbenzene having recurring units of Formula (A) thereto and conduct the reaction at a desired temperature. It is preferred to conduct the reaction with stirring or shaking. Also, it is preferred to avoid contact of the reactants and the reaction mixture with water or moisture in the air. After completion of the desired reaction, the reaction is required to be terminated by addition of an alcohol such as methanol and ethanol or water in an amount equal to or more than the mole of the alkali metal amide of Formula (E).

This process which comprises firstly producing a linear polydivinylbenzene having recurring units of Formula (A) from divinylbenzene and secondly aminating the linear polydivinylbenzene separated is hereinafter referred to "two-step process".

Another process of preparing a linear copolymer having recurring units of Formulae (A) and (B) according to this invention comprises producing a linear polydivinylbenzene having recurring units of Formula (A) from divinylbenzene and continuously aminating the linear polydivinylbenzene produced without its separation. More specifically, this process which is hereinafter referred to "one-step process" comprises adding lithium diisopropylamide and divinylbenzene to an inert polar solvent in the presence of diisopropylamine and mixing the reaction mixture solution with an amine of Formula (D).

In this one-step process, the same inert polar solvents, diisopropylamine, lithium diisopropylamine, divinylbenzene and amine of Formula (D) as in the two-step process can be used. Either to the reaction mixture solution of divinylbenzene and lithium diisopropylamide may be added an amine of Formula (D) or to the amine of Formula (D) may be added the reaction mixture solution of divinylbenzene and lithium diisopropylamide. The amine of Formula (D) can be used either in their pure form or as their solution, and after mixing the amine of Formula (D) with the reaction mixture solution of divinylbenzene and lithium diisopropylamide, it is possible to add a solvent which can be employed in the amination of the two-step process to the resulting mixture solution. As for the amination, the same reaction conditions as in the one-step process can be employed.

In order to separate and purify the product, conventional methods such as re-precipitation, gel chromatography and ion-exchange chromatography can be employed.

The structural features of the linear copolymers having recurring units of at least one of Formulae (B) and (C) which are obtained in the one-step process or in the two-step process are the same as those of the linear polydivinylbenzene having recurring units of Formula (A).

According to the two-step process, the design of reaction can be made more strictly since as the starting material is employed the linear polydivinylbenzene whose characterization has be sufficiently done after the separation and purification. On the other hand, according to the one-step process, the period of the entire operation time can be shortened, and further the amount of an expensive lithium amide which acts as a common catalyst for the polymerization of divinylbenzene and the amination of the linear polydivinylbenzene can be reduced and also, the solvents common the polymerization and the amination can be advantageously employed.

Further, when the lithium copolymer having recurring units of Formulae (A) and (B) is reacted or neutralized with an acid which is denoted as HX, all or part of the recurring units of Formula (B),

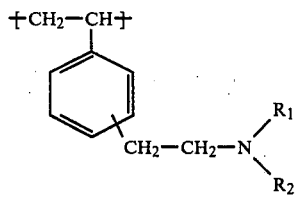

are converted into recurring units of Formula (B')

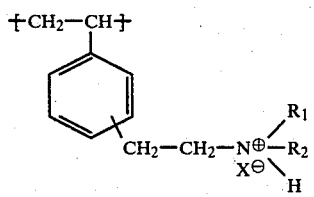

wherein $R_1$ and $R_2$ are the same as defined in Formula (B), but when $R_1$ and/or $R_2$ is a $H_2N{+}CH_2{\overline{)_n}}$ group or a $H{+}NH-CH_2-CH_2{\overline{)_m}}$ group wherein n is an integer of 1 to 15 and m is an integer of 2 to 8, the $H_2N{+}CH_2{\overline{)_n}}$ group and the $H{+}NH-CH_2-CH_2{\overline{)_m}}$ group becomes a

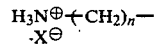

group or a

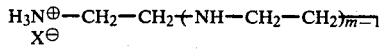

group.

Exemplary acids of HX include mineral acids such as hydrogen fluoride, hydrogen chloride, hydrogen bromide, hydrogen iodide, sulfuric acid, sulfurous acid, nitric acid, nitrous acid, chromic acid, thiocyanic acid, perchloric acid, phosphoric acid, carbonic acid and permanganic acid; carboxylic acids such as formic acid, acetic acid, propionic acid, n-capric acid and stearic acid; substituted carboxylic acid such as monochloroacetic acid, monofluoroacetic acid, lactic acid, benzoic acid and toluic acid; and sulfonic acids such as benzenesulfonic acid, p-toluenesulfonic acid, dodecylbenzenesulfonic acid, methanesulfonic acid and ethanesulfonic acid.

The amount of the acid of HX which can be employed is not limited and typically ranges from about 0.01 to about 100 equivalents based on the total nitrogen atoms of the copolymer.

In the reaction or neutralization with an acid, the copolymer which can be employed may be the one either as such or washed or dried after the polymerization. The acids can be employed either in their pure form or as their solution.

Also, when the linear copolymer having recurring units of Formulae (A) and (B) is quaternized with a quaternizing agent of $R_3X$, all of the recurring units of Formula (A) are converted into recurring units of Formula (C),

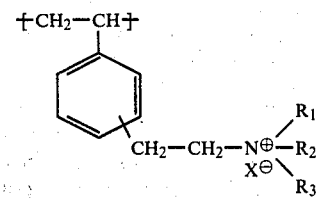

wherein $R_1$, $R_2$, $R_3$ and X are the same as defined above excepting that $R_3$ is a hydrogen atom.

Exemplary quaternizing agents of $R_3X$ include halogenated alkyls, alkenyls or aryls such as methyl iodide, methyl bromide, methyl chloride, ethyl chloride, ethyl bromide, n-octyl bromide, n-dodecyl chloride, cyclohexyl chloride and cycloheptyl bromide; allyl bromide and crotyl chloride; and benzyl bromide and phenethyl chloride, and dialkyl sulfates such as dimethyl sulfate and diethyl sulfate.

The quaternizing agent can be applied either in the liquid phase or as a gas, but it is preferred that the quaternizing agent is employed in the liquid phase.

The amount of the quaternizing agents of $R_3X$ which can be employed is not particularly limited and typically ranges from about 0.01 to about 100 equivalents based on the total nitrogen atoms of the linear copolymer having recurring units of Formulae (A) and (B).

When the quaternizing agent is employed in the liquid phase, the quaternization can be conducted by mixing the liquid quaternizing agent with the starting linear copolymer having recurring units of Formulae (A) and (B) in the presence of an unreactive solvent. Appropriate unreactive solvents for conducting the quaternization in the liquid phase are highly polar solvents or those which dissolve the linear copolymers having recurring units of Formulae (A) and (B) and include acetone, methanol, ethanol, N,N-dimethylformamide and dimethyl sulfoxide. However, the most preferred solvent should be selected depending upon the quaternizing agent employed and the reaction condition chosen.

It is preferred that the copolymer which can be employed in the quaternization is purified by thoroughly washing with the unreacted solvent or dried prior to use.

The polymers which are provided in the present invention are the following 4 types.

(I) Linear polydivinylbenzenes having recurring units of Formula (A):
(II) Linear copolymers having recurring units of Formulae (A) and (B);
(III) Linear copolymers having recurring units of Formulae (A) and (C); and
(IV) Linear copolymers having recurring units of Formulae (A), (B) and (C).

The linear polydivinylbenzenes of Type (I) which have a number of pendent double bonds as active groups not only become starting materials for preparing the linear copolymers of Types (II), (III) and (IV) but also can be used as high molecular weight cross-linking agents and become starting material for preparing ion exchange resins.

The linear copolymers of Types (II), (III) and (IV) which have a high molecular weight and, at the same time, polymerizable double bonds possess characteristic features as polymers and monomers and are unique substances and show basicity due to the substituted amino groups. Basic three-dimensionally cross-linked polymers or copolymers can be obtained by polymerizing the linear copolymers of Type (II) or copolymerizing the linear copolymers of Type (II) with other monomers, and weak anion exchangers and basic adsorbents can be produced.

The linear copolymers of Type (III) which have substituted ammonium groups are soluble in water and can be used as coagulants. Also, when the linear copolymers of Type (III) are polymerized or copolymerized with other monomers, anion exchangers can be obtained. In this case, when $R_1$, $R_2$ and $R_3$ are other groups than hydrogen atoms at the same time, the resulting polymers or copolymers become strongly basic anion exchangers.

The linear copolymers of Type (IV) which have substituted amino groups and substituted ammonium groups can also be used as coagulants and the solubility in water and the performance as coagulants can be controlled by varying the relative amount of the substituted amino groups and the substituted ammonium groups.

The present invention will now be illustrated in greater detail with reference to several Examples, but they are given for illustrative purposes only and are not to be construed as limiting the invention.

EXAMPLE 1

In a 3 l three necked flask equipped with a stirrer, a dropping funnel and a thermometer were charged 1 l of purified tetrahydrofuran dried with sodium and 120 g of diisopropylamine, and to the mixture were added 60 ml of a 15% n-butyllithium solution in tetrahydrofuran with sufficient stirring. To the mixture thus obtained was added a mixture of 91 g of p-divinylbenzene and 1 l of tetrahydrofuran from the dropping funnel and stirring was continued for one hour while maintaining the temperature of the mixture at about 20° C. The reaction was terminated by addition of 2 ml of water and the white precipitates formed were separated by filtration. Then, the number average molecular weight of the product was measured by subjecting part of the filtrate to gel permeation chromatography using a high-speed liquid chromatograph (made by Toyo Soda Manufacturing Co., Ltd., model "HLC 802 UR") equipped with TSK gel G4000, G3000 and 2×G2000 (made by Toyo Soda Manufacturing Co., Ltd.) connected in series as columns and was found to be about 90,000.

Further, methanol was added to the filtrate and the white precipitates formed were separated by filtration, thoroughly washed with methanol and dried. The yield was 90%. This product was soluble in benzene, acetone or chloroform. The structure of the product was determined by the following analytical values and confirmed to be a linear poly-p-divinylbenzene.

Elemental Analysis: C: 91.95%, H: 7.84%.
Infrared Absorption Spectrum (Characteristic Absorptions): 840, 905, 990, 1410, 1510, 1610, 1630 cm$^{-1}$.
Proton NMR Spectrum [Solvent: CDCl$_3$, Reference: (CH$_3$)$_4$Si]:
2.8–0.5 ppm (broad 1 peak; relative intensity=3)
6.0–5.0 ppm (broad 4 peaks; relative intensity=2)
7.6–6.0 ppm (broad 2 peaks; relative intensity=5)

EXAMPLE 2

In a 200 ml stainless steel autoclave equipped with a stirrer were charged 80 ml of tetrahydrofuran which were dried over metallic sodium and subjected to distillation. Then, the autoclave was sufficiently cooled externally with a mixture of dry ice-methanol. A cylinder containing ethylamine (manufactured by Tokyo Kasei Kogyo Co., Ltd.) was connected to the autoclave and ethylamine was introduced into the autoclave by opening the valve. From the change in weight of the cylinder before and after the introduction of ethylamine, 6.0 g of ethylamine was confirmed to be introduced. Then 1.3 ml of a 15% n-butyllithium solution in n-hexane were introduced into the autoclave with stirring and subsequently, to the mixture was added a solution of 2.6 g of the linear poly-p-divinylbenzene as obtained in Example 1 in 40 ml of tetrahydrofuran. The autoclave was placed in a water bath maintained at 20° C. and stirring was continued for 12 hours. The reaction mixture was poured into water and the polymer formed was separated.

Elemental Analysis: C: 84.82%, H: 9.33%, N: 5.85%

EXAMPLE 3

In a 50 ml round bottomed flask was charged 20 ml of an inert polar solvent as set forth in Table 1, and while magnetically stirring, firstly, diisopropylamine, secondly, a 15% n-butyllithium solution in hexane and thirdly, divinylbenzene in an amount as set forth in Table 1 were injected via a syringe, respectively, and stirring was continued at a temperature for a period of time as set forth in Table 1. The reaction was terminated by addition of 0.1 ml of water and the procedures of Example 1 were repeated to give a polymer. The number average molecular weight of the polymer is shown in Table 1.

TABLE 1

| | | | Reaction Conditions | | | | |
|---|---|---|---|---|---|---|---|
| Run No. | Divinylbenzene (g) | Diisopropyl-amine (g) | 15% n-Butyllithium Solution in n-Hexane (ml) | Inert Polar Solvent (ml) | Temperature (°C.) | Period of Time (minute) | Number Average Molecular Weight of Product |
| 1 | Para-isomer 1.8 | 1.6 | 3 | Tetrahydrofuran | 20 | 5 | 20,000 |
| 2 | Para-isomer 1.8 | 0.8 | 0.6 | " | " | " | 120,000 |
| 3 | Meta-isomer 0.9 | 0.2 | " | " | " | 240 | 6,000 |
| 4 | Para-isomer 0.9 | 31 | 3.8 | " | 30 | 20 | 1,000 |
| 5 | Para-isomer 0.9 | 0.2 | 0.3 | " | −10 | 40 | 180,000 |
| 6 | Para-isomer 0.9 | 0.8 | 0.6 | Dimethyl sulfoxide | 25 | 10 | 7,000 |

EXAMPLE 4

In a 5 l three necked flask equipped with a stirrer, a dropping funnel and a thermometer were charged 2.5 l of dry tetrahydrofuran and then under stirring the following reagents (i) to (iii) were successively added thereto.
(i) 131 g of diisopropylamine
(ii) 480 ml of a 15% n-butyllithium solution in n-hexane
(iii) 130 g of p-divinylbenzene The resulting mixture was stirred for 10 minutes and the inner temperature of the flask was 20° C. to 25° C. Then 15 ml of water were added to the reaction mixture and the precipitates formed was separated by filtration and the filtrate was poured into methanol. The polymer obtained was separated by a Buchner funnel, washed with 1 l of methanol and dried. The yield was 80 g. The polymer thus obtained was soluble in acetone or chloroform but insoluble in n-hexane.

EXAMPLE 5

In a 1 l round bottomed flask equipped with a three-way cock was placed a magnetic stirrer and the air in the flask was replaced with nitrogen gas and subsequently a mixture of 100 ml of dry tetrahydrofuran and 73 g of diethylamine was charged in the flask. While performing magnetic stirring, firstly, 8.4 ml of a 15% n-butyllithium solution in n-hexane and secondly, a solution of 18.2 g of the polymer as obtained in Example 4 in 200 ml of tetrahydrofuran were added to the mixture, respectively, and stirring was continued at 40° C. for 24 hours. Then the reaction mixture was poured into a large amount of water to form white precipitates and the precipitates were sufficiently washed with water and dried to give 27 g of a polymer. This polymer was soluble in methanol, chloroform or benzene but insoluble in acetone or N,N-dimethylformamide and had the following analytical values.

Elemental Analysis: C: 83.81%, H: 9.98%, N: 6.21%.

From this result, the rate of amination, i.e., the percent by weight of the recurring units of the formula,

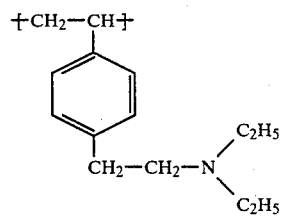

was about 90%.

Infrared Absorption Spectrum (Characteristic Absorptions): 825, 1070, 1125, 1200, 1390, 1450, 1510 cm$^{-1}$.

Proton NMR Spectrum [Solvent: CDCl$_3$, Reference: (CH$_3$)$_4$Si]
0.8-1.2 ppm (broad 1 peak)
2.3-2.8 ppm (broad 1 peak)
6.0-7.2 ppm (broad 1 peak)

In 50 ml of a 2 N hydrochloric acid were dissolved 2 g of the polymer as obtained above and then the water and the hydrochloric acid were evaporated therefrom and the residue was dried at 70° C. for 24 hours to give a hygroscopic polymer.

Elemental Analysis: C: 71.97%, H: 8.99%, N: 5.16%, Cl: 13.87%.

REFERENTIAL EXAMPLE 1

In a 200 ml four necked flask equipped with a stirrer, a reflux condenser and a thermometer were charged 100 g of pure water in which 0.5 g of partially saponified polyvinyl alcohol having a degree of saponification of 88% and a viscosity of its 2% aqueous solution of 23 cps. and 2 g of sodium chloride had been dissolved, followed by addition of a homogeneous mixture of 10 g of the partially diethylaminated linear poly-p-divinylbenzene as obtained in Example 5, 2 g of p-diethylaminoethylstyrene, 0.1 g of 2,2'-azobisisobutyronitrile and 8 g of toluene with stirring. Then the mixture was stirred at 80° C. for 18 hours to give a copolymer in the form of a spherical particles having a particle diameter of 50 to 400μ. The copolymer thus produced were separated by filtration, thoroughly washed with 1 l of warm water and then with 500 ml of acetone, packed into a glass column having an inner diameter of 1.2 cm and equipped with a glass filter at a height of several centimeters, and 200 ml of 1 N hydrochloric acid were flowed down through the column and the height of the copolymer packed was measured. Then 100 ml of acetone were flowed through the column and subsequently 100 ml of a 1 N potassium nitrate solution were flowed through the column and the chlorine ion in the potassium nitrate solution passed was quantitative by analyzed by the Fajans' method. Further, 100 ml of 1 N hydrochloric acid was flowed the column and then the copolymer packed was withdrawn from the column, subjected to vacuum drying at 80° C. for 18 hours and then weighed. The cross-linked copolymer thus obtained was found to be an anion exchanger having an exchange capacity of 3.36 meq./g.

REFERENTIAL EXAMPLE 2

In a 100 ml pressure resistant glass tube was charged a homogeneous mixture of 5 g of the linear poly-p-divinylbenzene as obtained in Example 4, 20 g of 4-vinylpyridine, 0.5 g of 2,2'-azobisisobutyronitrile and 50 g of cyclohexanone and the air in the upper portion of the glass tube was replaced by nitrogen gas. Then the glass tube was melt-sealed and left to stand in an oil bath at 70° C. for 18 hours. The contents were taken out of the glass tube, pulverized into fine particles having a particle diameter of 100 to 500μ, sufficiently washed with acetone and dried. The polymer thus obtained had the following analytic values.

Infrared Absorption Spectrum (Characteristic Absorptions): 815, 990., 1060, 1210, 1410, 1590 cm$^{-1}$ Exchange Capacity (measured in the same manner as in Referential Example 1):
0.90 meq./ml (wet volume)
5.61 meq./g (dry weight)

EXAMPLE 6

To a 300 ml pressure resistant bottle equipped with a magnetic stirring device was connected a tube equipped with a three way cock. To the tube were connected a vacuum pump and a cylinder containing dimethylamine, respectively, and a drying tube containing potassium hydroxide was provided between the three way cock and the cylinder containing dimethylamine. After the inner pressure of the bottle was sufficiently reduced by the vacuum pump, the bottle was sealed and immersed in a mixed liquid of dry ice-methanol at −78° C. to sufficiently cool. Then a desired amount of liquid dimethylamine was introduced into the bottle by opening the valve. From the change in weight of the cylinder before and after the introduction of dimethylamine, 31 g of dimethylamine was confirmed to be introduced. The vacuum pump was disconnected from the tube equipped with a three way cock and a cylinder containing nitrogen was connected to the tube and further the cylinder containing dimethylamine. After the three way cock was opened, the following reagents (i) to (iii) were successively injected to the bottle via syringe while stirring and introducing nitrogen gas.
(i) 95 g of benzene
(ii) 4.8 ml of a 15% n-butyllithium solution in n-hexane
(iii) A mixture of 13 g of the linear poly-p-divinylbenzene as obtained in Example 4 and 100 g of benzene.

After the introduction of these reagents the autoclave was sealed and stirring was continued at 20° C. for 28 hours. Then to the reaction mixture was 0.5 ml of methanol, and excess dimethylamine was completely removed from the mixture by an evaporator and the remaining mixture was poured into a large amount of acetone to precipitate a polymer. The polymer thus formed was separated and purified. The yield of the polymer was 70%.

Elemental Analysis: C: 83.02%, H: 9.46%, N: 7.51%.

From this result, the rate of amination, i.e., the percent by weight of the recurring units of the formula,

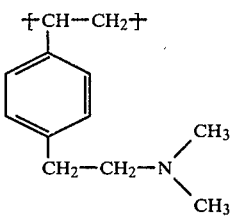

was 95%.

EXAMPLE 7

In a 200 ml round bottomed flask equipped with a three may cock was placed a magnetic stirrer and the air in the flask was replaced with nitrogen gas and firstly, 75 ml of purified tetrahydrofuran and secondly, 8.8 ml of N-methylethylenediamine were injected into the flask via a syringe, respectively. Then stirring was started and 0.4 ml of a 2 N n-butyllithium solution in cyclohexane was added thereto. To the mixture thus obtained was added a solution of 2.6 g of the linear polydivinylbenzene as obtained in Example 4 in 42 ml of tetrahydrofuran and stirring was continued at 30° C. for 16 hours. After the reaction, the reaction mixture was poured into water and the precipitates formed were separated by filtration and washed with water. The polymer thus obtained had the following analytical values.

Elementary Analysis: C: 77.92%, H: 9.74%, N: 12.18%

According to the mercuric acetate method, the polymer was found to have 90 percent by weight of the recurring units of the formula,

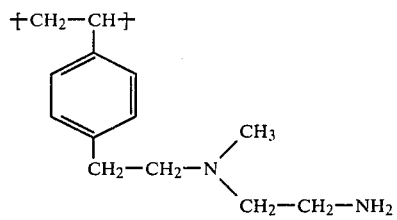

and 10 percent by weight of the recurring units of the formula,

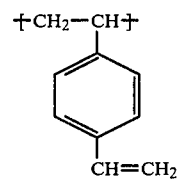

EXAMPLE 8

The procedures of Example 7 were repeated except that 4.3 g of ethyleneimine were employed instead of 8.8 ml of N-methylethylenediamine, and 2.5 g of a polymer were obtained.

Elemental Analysis: C: 83.21%, H: 8.92%, N:8.96%.

EXAMPLE 9

In a 300 ml three necked flask were charged 10 g of the same polymer as obtained in Example 5, and further 80 ml of ethanol and 110 g of ethyl bromide. The mixture was stirred at 30° C. for 6 hours and the reaction mixture was poured into acetone and the solid formed was dried under vacuum. The result of elemental analysis of the product is as follows; C: 77.18%, H: 9.31%, N: 5.88%, Br: 7.76%

REFERENTIAL EXAMPLE 3

5 g of the product was obtained in Example 9, 10 g of isopropanol and 0.1 g of 2,2'-azobisisobutyronitrile were mixed in a 30 ml pressure resistant glass tube and the tube was melt-sealed and left to stand in water at 70° C. for 18 hours. Then the solid polymer obtained was taken out of the tube, pulverized into fine particles having a particle diameter of 100 to 500μ and packed into a column equipped with a glass filter, and 100 ml of acetone was flowed through the column to wash the polymer and subsequently 300 ml of 4 N hydrochloric acid flowed through the column. Further, the polymer was washed with 50 ml of acetone and in the same manner as in comparative Example 1 the chlorine ion bonded to the polymer was quantitatively analyzed to find to be 6.02 mmole. Then the following solutions (i) to (iv) were successively flowed through the column.
(i) 200 ml of pure water
(ii) 200 ml of 1 N sodium hydroxide solution
(iii) 200 ml of pure water
(iv) 100 ml of 1 N sodium chloride solution The hydroxyl ion in the solution (iv) passed was found to be 1.55 mmole by neutralization titration. As the result, the degree of quaternization was 26% (1.55/6.02).

EXAMPLE 10

In a 500 ml autoclave equipped with a stirrer were charged 10 g of the thoroughly dried polymer as obtained in Example 6 and 100 ml of methanol, and to the autoclave was connected a cylinder containing methyl chloride and methyl chloride was introduced into the autoclave whose inner pressure was maintained at 1 Kg/cm$^2$·gauge and stirring was continued at 40° C. for 24 hours. The reaction mixture obtained was taken out of the autoclave to poured into ethyl acetate at −50° C. to form precipitates. The product thus obtained was a hygroscopic solid.

Elemental Analysis: C: 70.03%, H: 8.97%, N: 6.22%, C: 15.28%.

REFERENTIAL EXAMPLE 4

In a cylindrical glass cell for sedimentation test having a diameter of 32 mm and a length of 260 mm and a fittable cock at the upper part were charged 150 ml of a liquid having a pH of 4.2 and containing 10 g/liter of active sludge obtained by cultivation on milk powder. Four of these cells were prepared and each cell was subjected to rotation at 25° C. for 5 times and left to stand. The rate of sedimentation in each cell is shown at Column A in Table 2. Further, sedimentation tests were conducted using four of these cells with addition of the same polymer as obtained in Example 10 at a varied concentration by subjecting each cell to rotation for 5 times and leaving it to stand. The rate of sedimentation is shown at Column B in Table 2.

TABLE 2

| | A | B | |
|---|---|---|---|
| Cell No. | Rate of Sedimentation (cm/min.) | Concentration of Polymer (ppm) | Rate of Sedimentation (cm/min.) |
| 1 | 7.3 | 2 | 14.0 |
| 2 | 7.4 | 4 | 17.6 |
| 3 | 7.2 | 10 | 16.8 |
| 4 | 7.4 | 20 | 15.9 |

EXAMPLE 11

In a 300 ml three necked flask equipped with a stirrer, a dropping funnel and a thermometer were charged 100 ml of purified tetrahydrofuran dried with sodium metal, and to the mixture were added 6 ml of a 15% n-butyllithium solution in tetrahydrofuran with sufficient stirring. Then a mixture of 9.1 g of p-divinylbenzene and 100 ml of tetrahydrofuran was added thereto from the dropping funnel and stirring was continued for one hour. The number average molecular weight of the product was measured by subjecting part of the reaction mixture to gel permeation chromatography and was found to be about 90,000.

Then to the reaction mixture were added 18.2 g of diethylamine and stirring was continued at 40° C. for 20 minutes, and subsequently the reaction mixture was poured into a large amount of water to form precipitates. The precipitates were separated, washed with water and dried to give 10.3 g of a polymer having the following analytical values.

Elemental Analysis: C: 78.96%, H: 9.32%, N: 11.66%.

From this result, it was found that the polymer had 25% by weight of the recurring units of the formula,

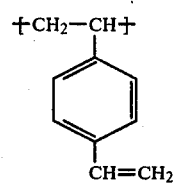

and 75% by weight of the recurring units of the formula,

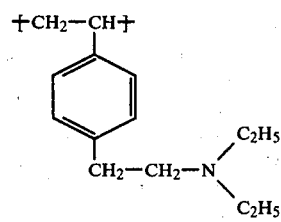

EXAMPLE 12

In a 500 ml three necked flask equipped with a thermometer was placed a magnetic stirrer and the air in the flask was thoroughly replaced by nitrogen gas. Then, 200 ml of dry tetrahydrofuran were charged in the flask and 12 ml of a 1 N n-butyllithium solution in tetrahydrofuran were added thereto. To the mixture were added 10 g of diisopropylamine and further 13 g of p-divinylbenzene with sufficient stirring and stirring was continued at 20° C. for 10 minutes. Then the amine solution as set forth in Table 3 was added to the resulting mixture and stirring was continued under the conditions as set forth in Table 3. After the reaction was completed, the reaction mixture was poured into a large quantity of water and the precipitates obtained were collected and washed with water. The results of elemental analysis of the dried product and the percent by weight of the repeating units of the formula,

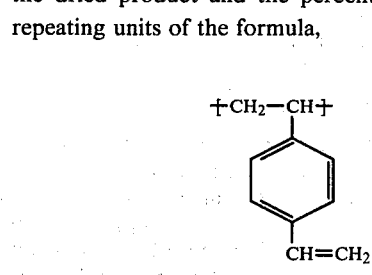

based on the total weight of the product are shown in Table 3.

TABLE 3

| Run No. | Amine (g) | Solvent (ml) | Stirring Conditions Temperature (°C.) | Time (hour) | C (%) | H (%) | N (%) | −CH$_2$−CH−(C$_6$H$_4$)−CH=CH$_2$ (weight %)* |
|---|---|---|---|---|---|---|---|---|
| 1 | N—Methylethylenediamine 37 | Diethyl ether 100 | 30 | 18 | 78.66 | 9.43 | 12.01 | 90 |
| 2 | Cyclohexylamine 5 | Tetrahydrofuran 20 | 30 | 7 | 89.62 | 8.03 | 1.52 | 25 |
| 3 | Benzylamine 107 | Diethyl ether 10 | 40 | 6 | 90.15 | 7.76 | 2.18 | 40 |
| 4 | Hexadecylamine 48 | Tetrahydrofuran 50 | 30 | 6 | 87.94 | 10.16 | 2.26 | 60 |
| 5 | Diallylamine 7.8 | Cyclohexane 50 | 40 | 3 | 90.71 | 8.43 | 1.00 | 15 |
| 6 | Aniline 4.7 | Tetrahydrofuran 20 | 20 | 3 | 92.40 | 7.68 | 0.30 | 5 |

REFERENTIAL EXAMPLE 5

The procedures of Referential Example 2 were repeated except that a homogeneous mixture of 7.5 g of the polymer as obtained in Rum No. 5 of Example 12, 17.5 g of p-isopropylaminoethylstyrene, 0.5 g of 2,2'-azobisisobutyronitrile and 50 g of cyclohexanone was employed. The cross-linked copolymer thus obtained had the following analytical values.

Infrared Absorption Spectrum (Characteristic Absorptions): 820, 1010, 1120, 1160, 1370, 1440 cm$^{-1}$ Exchange Capacity:
3.16 meq./g (dry weight)
0.63 meq./ml (wet volume)

EXAMPLE 13

In a 5 l three necked flask equipped with a stirrer and a dropping funnel were charged 2300 ml of purified tetrahydrofuran and then 164 g of diisopropylamine, and to the mixture were added 480 ml of a 15% n-butyllithium solution in n-hexane with stirring. Subsequently 130 g of p-divinylbenzene were added dropwise thereto and the mixture was stirred at 20° C. for 5 minutes and then 153 g of isopropylamine were added thereto. The mixture thus obtained was stirred for 5 hours and after the reaction the reaction mixture was poured into 10 l of methanol to obtain 90 g of a polymer. This polymer was soluble in acetone, tetrahydrofuran, benzene or chloroform but insoluble in cold n-hexane or cold methanol. The number average molecular weight of the polymer was 6,000.

Elemental Analysis: C: 91.52%, H: 7.70%, N: 0.88%.
Proton NMR Spectrum [Solvent: CDCl$_3$, Reference: (CH$_3$)$_4$Si]:
0.9–3.3 ppm [broad 1 peak, 1.1 Hz, doublet (coupling constant=7 Hz)]
5.0–6.0 ppm (broad 4 peaks)
6.1–7.8 ppm (broad 2 peaks)

EXAMPLE 14

The air in a 100 ml round bottomed flask was replaced with nitrogen gas and 20 ml of tetrahydrofuran were charged therein as the solvent. Then to the solvent were added firstly, 1.5 ml of diisopropylamine, secondly, 1 ml of a 1 N methyllithium solution in diethyl ether and thirdly, 20 ml of a 10% p-divinylbenzene solution in tetrahydrofuran previously prepared, respectively. The reaction was conducted at 20° C. for 3 minutes. The formation of a linear polydivinylbenzene was confirmed by sampling the reaction mixture solution and adding methanol to the reaction mixture. Then to the reaction mixture were added 1.5 ml of diethylenetetramine and the reaction was continued at 20° C. for 24 hours. After the reaction 0.1 ml of water was added to the reaction mixture solution to form precipitates and the precipitates were separated by filtration, followed by the evaporation of diethylenetetramine and tetrahydrofuran. The residue was again dissolved in 30 ml of tetrahydrofuran and the solution was poured into hexane to re-precipitate a polymer, followed by the separation of the polymer. The purified product had the following analytical values.

Elemental Analysis: C: 72.13%, H: 9.88%, N:18.04%.

EXAMPLE 15

The procedures of Example 1 were repeated except that m-divinylbenzene was used instead of the p-divinylbenzene and that the polymerization time was 3 hours instead of 1 hour. After the polymerization, the number average molecular weight of the polymer obtained was measured by subjecting part of the reaction mixture to the same gel permeation chromatography as in Example 1 and found to be 4,000. This polymer had the following analytical values.

Elemental Analysis: C: 92.02%, H: 7.91%.
Infrared Absorption Spectrum (Characteristic Absorptions): 710, 800, 905, 990, 1440, 1490, 1600 cm$^{-1}$ Further, in a 100 ml pressure resistant glass bottle were charged a mixture of 20 ml of ethyl ether and 12.3 g of N,N'-dimethylethylenediamine and 1 ml of a 1 N methyllithium solution in ethyl ether, and then to the mixture were added 20 ml of a tetrahydrofuran solution dissolving 1.8 g of the polymer as obtained above therein. The mixture was shaked at 30° C. for 10 hours and the polymer thus produced had the following analytical values.

Elemental Analysis: C: 83.02%, H: 9.32%, N: 7.41%.

While the invention has been described in detail and with reference to specific embodiments thereof, it will be apparent to one skilled in the art that various changes and modifications can be made therein without departing from the spirit and scope thereof.

What is claimed is:
1. A process of preparing a linear polydivinylbenzene having recurring units of Formula (A),

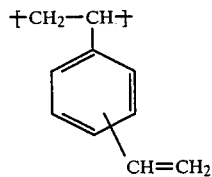 (A)

and a number average molecular weight of about 500 to about 1,000,000, which comprises adding lithium diisopropylamide and divinylbenzene to an inert polar solvent in the presence of diisopropylamine.

2. The process of claim 1, wherein the divinylbenzene is p-divinylbenzene.

3. The process of claim 1, wherein the divinylbenzene is m-divinylbenzene.

4. The process of claim 1, wherein the amount of the lithium diisopropylamide is about 0.001 to about 1.0 mole per mole of the divinylbenzene.

5. The process of claim 1, wherein the amount of the diisopropylamine is about 0.5 to about 50 moles per mole of the lithium diisopropylamide.

6. The process of claim 1, wherein the volume ratio of the inert polar solvent to the divinylbenzene is about 1 to about 50.

7. The process of claim 1, wherein the inert polar solvent is selected from the group consisting of tetrahydrofuran, dimethyl sulfoxide, N,N-dimethylformamide, hexamethylenephosphoric triamide, N-methyl-2-pyrrolidone and N,N-dimethylacetamide.

8. The process of claim 7, wherein the inert polar solvent is tetrahydrofuran.

9. The process of claim 1, wherein the lithium diisopropylamide is prepared from diisopropylamine and a $C_{1-20}$ alkyl lithium.

10. The process of claim 9, wherein the $C_{1-20}$ alkyl lithium is n-butyl lithium.

11. The process of claim 4, wherein the amount of the lithium diisopropylamide is about 0.01 to about 0.5.

12. The process of claim 5, wherein the amount of the diisopropylamine is about 1.5 to about 20.

* * * * *